US012599864B2

(12) United States Patent
Kolczyk

(10) Patent No.: US 12,599,864 B2
(45) Date of Patent: Apr. 14, 2026

(54) AIR TREATMENT SYSTEM, METHOD, VEHICLE AND FLEET FOR TREATING ENVIRONMENT AIR

(71) Applicant: MANN+HUMMEL GmbH, Ludwigsburg (DE)

(72) Inventor: Markus Kolczyk, Mundelsheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 439 days.

(21) Appl. No.: 18/172,386

(22) Filed: Feb. 22, 2023

(65) Prior Publication Data

US 2023/0294031 A1 Sep. 21, 2023

(30) Foreign Application Priority Data

Mar. 18, 2022 (EP) ..................................... 22162891

(51) Int. Cl.
| | |
|---|---|
| *B01D 46/46* | (2006.01) |
| *B01D 46/42* | (2006.01) |
| *B01D 46/44* | (2006.01) |
| *B60H 1/00* | (2006.01) |
| *B60K 35/80* | (2024.01) |
(Continued)

(52) U.S. Cl.
CPC ........... *B01D 46/46* (2013.01); *B01D 46/429* (2013.01); *B60K 35/80* (2024.01); *B01D 46/44* (2013.01); *B01D 2279/40* (2013.01); *B60H 1/00657* (2013.01); *B60H 1/00735* (2013.01); *B60K 35/90* (2024.01); *B60K 2360/5915* (2024.01); *H04W 4/46* (2018.02)

(58) Field of Classification Search
None
See application file for complete search history.

(56) References Cited

U.S. PATENT DOCUMENTS

| | | |
|---|---|---|
| 3,738,088 A | 6/1973 | Colosimo |
| 5,147,429 A | 9/1992 | Bartholomew |
| (Continued) | | |

FOREIGN PATENT DOCUMENTS

| | | |
|---|---|---|
| CN | 104033999 A | 9/2014 |
| DE | 10329961 A1 | 1/2005 |
| (Continued) | | |

OTHER PUBLICATIONS

JP2011037428A_ENG (Espacenet machine translation of Takeda) (Year: 2011).*

*Primary Examiner* — Gabriel E Gitman

(57) ABSTRACT

Method and vehicle including an air treatment system for treating environment air; a control circuit to control the air treatment system; a communication interface configured to wirelessly send and receive commands external to the vehicle and operably coupled to the control circuit. The control circuit configured to, via the communication interface, receive a request for treatment; determine if the air treatment system has an additional treatment capacity available; via the communication interface, send an acknowledgement if additional treatment capacity is available; and, to control the air treatment system to increase treatment capacity. One aspect of the disclosure concerns a fleet of two or more vehicles in accordance with various embodiments. The two or more vehicles may be configured to operably communicable with each other.

12 Claims, 6 Drawing Sheets

(51) Int. Cl.
  *B60K 35/90* (2024.01)
  *H04W 4/46* (2018.01)

(56) References Cited

U.S. PATENT DOCUMENTS

| | | | |
|---|---|---|---|
| 5,162,053 A | 11/1992 | Kowalski, Jr. | |
| 5,509,853 A | 4/1996 | Wells | |
| 5,676,913 A | 10/1997 | Cirillo et al. | |
| 5,997,831 A | 12/1999 | Dettling et al. | |
| 6,212,882 B1 | 4/2001 | Greger et al. | |
| 9,340,090 B2 * | 5/2016 | Fukatsu | B60L 53/62 |
| 11,245,749 B2 | 2/2022 | Sawada et al. | |
| 2001/0021363 A1 | 9/2001 | Poles et al. | |
| 2002/0172633 A1 | 11/2002 | Koermer et al. | |
| 2005/0000197 A1 | 1/2005 | Krantz | |
| 2006/0107636 A1 | 5/2006 | Gage | |
| 2010/0095924 A1 | 4/2010 | Harper | |
| 2011/0056383 A1 | 3/2011 | Make et al. | |
| 2011/0197767 A1 | 8/2011 | Seitz | |
| 2014/0366734 A1 | 12/2014 | Moro Franco | |
| 2017/0113517 A1 | 4/2017 | Kwon et al. | |
| 2017/0166209 A1 | 6/2017 | Mathissen et al. | |
| 2018/0037093 A1 | 2/2018 | Newman | |
| 2018/0134112 A1 | 5/2018 | Seiferlein et al. | |
| 2019/0118140 A1 | 4/2019 | Fingland et al. | |
| 2019/0149598 A1 | 5/2019 | Sawada et al. | |
| 2020/0122549 A1 * | 4/2020 | Seki | B60H 1/00807 |
| 2020/0348033 A1 | 11/2020 | Krüger | |
| 2021/0063281 A1 | 3/2021 | Niemann et al. | |

FOREIGN PATENT DOCUMENTS

| | | | | | |
|---|---|---|---|---|---|
| DE | 202005005673 | U1 | 9/2005 | | |
| DE | 202006004522 | U1 | 6/2006 | | |
| DE | 102005028656 | A1 | 12/2006 | | |
| DE | 202006019335 | U1 | 4/2008 | | |
| DE | 102017008745 | A1 | 3/2018 | | |
| DE | 102017209476 | A1 | 12/2018 | | |
| DE | 102019004292 | A1 | 12/2020 | | |
| EP | 0628338 | A1 | 12/1994 | | |
| EP | 0707989 | A1 | 4/1996 | | |
| EP | 1571024 | A1 | 9/2005 | | |
| FR | 3076491 | A1 | 7/2019 | | |
| FR | 3111848 | A1 | 12/2021 | | |
| GB | 2218354 | A | 11/1989 | | |
| IN | 201941022243 | A | 12/2020 | | |
| JP | 4297341 | A2 | 10/1992 | | |
| JP | 2011037428 | A * | 2/2011 | | B60H 1/3213 |
| KR | 20190118936 | A | 10/2019 | | |
| KR | 102232950 | B1 | 3/2021 | | |
| NO | 10063452 | A2 | 6/2010 | | |
| WO | 0036342 | A1 | 6/2000 | | |
| WO | 03064008 | A1 | 8/2003 | | |
| WO | 2004047962 | A1 | 6/2004 | | |
| WO | 2005068053 | A1 | 7/2005 | | |
| WO | 2005094969 | A1 | 10/2005 | | |
| WO | 2009022891 | A1 | 2/2009 | | |
| WO | 2009145468 | A2 | 12/2009 | | |
| WO | 2009145469 | A2 | 12/2009 | | |
| WO | 2010084385 | A1 | 7/2010 | | |

* cited by examiner

200

100

AIR TREATMENT SYSTEM, METHOD, VEHICLE AND FLEET FOR TREATING ENVIRONMENT AIR

CROSS-REFERENCE TO RELATED APPLICATION

This patent application claims priority to European Patent Application No. EP22162891.0 filed with the European Patent Office on 18 Mar. 2022, the subject matter of which is hereby incorporated by reference.

TECHNICAL FIELD

An aspect of the disclosure concerns an air treatment system for treating environment air. Another aspect of the disclosure concerns a vehicle including an air treatment system for treating environment air. Another aspect of the disclosure concerns a fleet of two or more vehicles. Another aspect of the disclosure concerns a method of treating environmental air.

BACKGROUND ART

Due to progressive urbanization, the problem exists that the ambient air can exceed limit values for particulate matter and/or gases such as ozone, $NO_x$, CO many times over, especially in certain weather conditions (no rain, inversion, low wind speeds, no air exchange between altitudes), as a result of industrial waste gases, road traffic and private fireplaces.

The problem of traffic-related emissions has recently been exacerbated by calls for driving bans for certain groups of vehicles, especially diesel cars, in areas of particularly high air pollution due to their $NO_x$ and particular matter emissions. Ambient air filtration has been proposed in DE202006019335 U1 to reduce the net emission footprint of an internal combustion vehicle and requires that the internal combustion vehicle has an air filter which may have limited air treatment capacity.

Therefore, there persists the problem to provide for improved air cleaning.

SUMMARY

An aspect of the disclosure concerns air treatment system for treating environment air, the air treatment system configured to be installed and/or be part of a vehicle. An aspect of the disclosure concerns a vehicle including the air treatment system. The air treatment system may further include a control circuit to control the air treatment system. The air treatment system or the vehicle may further include a communication interface configured to wirelessly send and receive commands external to the vehicle and operably coupled to the control circuit. The control circuit may be configured to, via the communication interface, receive a request for treatment. The control circuit may be configured to, determine if the air treatment system has an additional treatment capacity available. The control circuit may be configured to, via the communication interface, send an acknowledgement if additional treatment capacity is available. The control circuit may be further configured to control the air treatment system to increase treatment capacity. According to various embodiments, treatment includes filtration and treating includes filtering.

According to various embodiments, the control circuit may be further configured to determine if there is treatment demand when a local treatment requirement is unsatisfied by the treatment system. The control circuit may be further configured to if there is a treatment demand, via the communication interface, send a request for remote treatment capacity and receive an acknowledgment. The control circuit may be further configured to provide (e.g., record) data indicative of the additional treatment capacity utilized on a memory. In examples, the memory may be implemented as any electronic circuit capable of storing information, such as based on D-flip-flips, and/or flash memory. In examples, the memory may be, without limitation, a local memory, a remote memory, a cache, a general purpose register, a register of a communication interface, or a combination thereof.

According to various embodiments, a total treatment may be recorded in memory, e.g., if the total capacity is utilized, the total treatment may be a sum of the local treatment capacity and one or more additional treatment capacities. As used herein and in accordance with various embodiments, additional treatment (e.g., as in additional treatment capacity) may mean remote treatment.

According to various embodiments, the acknowledgement may indicate that a requested additional treatment capacity is available and/or the acknowledgment may include a data indicative of the additional treatment capacity available.

According to various embodiments, to increase treatment capacity may mean to increase treatment capacity by the additional treatment capacity. If the additional treatment capacity is being fully utilized related to the current request, then a total treatment may be stored in memory as a sum of the local treatment capacity and the additional treatment capacitiy(ies). In some embodiments, the air treatment system and/or the method in accordance with various embodiments, may be configured so that on acknowledgement the additional treatment capacity is fully utilized.

According to various embodiments, to receive a request for treatment may include to receive data indicative of a require capacity also named herein as treatment demand, or simply demand. According to various embodiments, determine if the air treatment system has additional treatment capacity available may include determine whether the additional treatment capacity is greater or equal to the demand. For example, the capacity could be a capacity per pre-determined time slot, e.g., provided by a "heartbeat" clock used by the control circuit, which could also be known, pre-determined, and/or transmitted to the demand vehicle. Another timing could be used, e.g., a time frame for treatment could be determined during by a communication handshaking.

According to various embodiments, the acknowledgement may include data indicative of a cost rate of the additional treatment capacity. The control circuit may be further configured to, before to control the air treatment system to increase treatment capacity, receive a request confirmation. Optionally, the request confirmation may include a microtransaction (such as a micropayment) or micropayment indication data. A micropayment may correlate, e.g., with energy expenditure for air treatment, and/or cost associated with pollution. According to various embodiments, treatment includes filtration and treating includes filtering.

An aspect of the disclosure concerns a fleet of two or more vehicles in accordance with various embodiments. The two or more vehicles may be configured to operably communicable with each other. The first vehicle (also referred to as a demand vehicle) may be configured to requesting a second vehicle (also referred to as a supply vehicle) to provide air treatment, and the second vehicle may be configured to receive the request and control an air treatment system of the second vehicle to increase treatment capacity. According to various embodiments, treatment includes filtration and treating includes filtering. In some embodiments, the demand vehicle and the supply vehicle may communicate one or more movement data, e.g., routing or velocity vectors, which may serve for determining a distance or an overlap of the second vehicle within a desired region of the first vehicle, such as a radius of a circle centered on the first vehicle, or a region in which the first vehicle has passed or will pass within a pre-determine time. For example movement data of the demand vehicle may be transmitted to the supply vehicle for determination of distance at the supply vehicle, movement data of the supply vehicle may be transmitted to the demand vehicle for determination of distance at the demand vehicle, and/or movement data of the supply vehicle and the demand vehicle may be sent to a processor exterior to both vehicles (e.g., a cloud our another vehicle) for determination of distance.

As used herein and in accordance with various embodiments, the first vehicle and the second vehicle, or further vehicle(s) of the two or more vehicles are a fleet by the fact that they can operate together for air treatment— not necessarily because they are the same type or belong to same company. For example, other vehicles may be part of local traffic but not part of the fleet.

According to various embodiments, the fleet may include three or more vehicles, wherein a first vehicle is configured to request a plurality of vehicles, including at least a second vehicle, to provide air treatment, and wherein each vehicle of the plurality of vehicles is capable of receiving the request and control a respective air treatment system to increase treatment capacity.

An aspect of the disclosure concerns a method of treating environmental air. The method may include receiving, by a communication interface of a supply vehicle, a request for treatment, from a demand vehicle. According to various embodiments, the request for treatment may include a pre-determined distance, time, velocity vector, or a combination thereof. The method may further include determining, by a control circuit of the supply vehicle, that an air treatment system has an additional treatment capacity available. The method may further include sending, by the communication interface of the supply vehicle, an acknowledgement from the supply vehicle. The method may further include by the control circuit of the supply vehicle, controlling the air treatment system of the supply vehicle to increase treatment capacity. As used herein and in accordance with various embodiments, controlling the air treatment system may include the meaning of operating the air treatment system.

According to various embodiments, the method may further include sending, by the demand vehicle, a request for air treatment by a communication interface to a supply vehicle. The method may further include receiving, by the demand vehicle, an acknowledgement from the supply vehicle.

According to various embodiments, the method may further include, by the demand vehicle, determining that there is an air treatment demand by determining that there is a local treatment requirement unsatisfied by the treatment system, before sending the request for air treatment. In this context, the term "local" means from the demand vehicle.

According to various embodiments, the method may further include providing (e.g., recording), on a local memory of the supply vehicle, data indicative of the additional treatment capacity utilized. In examples, the memory may be implemented as any electronic circuit capable of storing information, such as based on D-flip-flips, and/or flash memory. In examples, the memory may be, without limitation, a local memory, a remote memory, a cache, a general purpose register, a register of a communication interface, or a combination thereof. According to various embodiments, the acknowledgement may include data indicative of an additional treatment capacity.

According to various embodiments, controlling the air treatment system to increase treatment capacity may include the meaning to increase the treatment capacity by the additional treatment capacity.

According to various embodiments, receiving a request for treatment may include receiving data indicative of a demand. Determining that the air treatment system has additional treatment capacity available may include determining that the additional treatment capacity is greater or equal to the demand.

According to various embodiments, the method may further include before controlling the air treatment system to increase treatment capacity, receiving a request confirmation, optionally including a microtransaction (such as a micropayment) or micropayment indication data. The acknowledgement may include data indicative of a cost rate of the additional treatment capacity.

According to various embodiments, the method may include sending, from the supply vehicle, data indicative of the additional treatment capacity utilized.

According to various embodiments, the method may include receiving, by the demand vehicle, the data indicative of the additional treatment utilized.

DETAILED DESCRIPTION

Figure 1A:
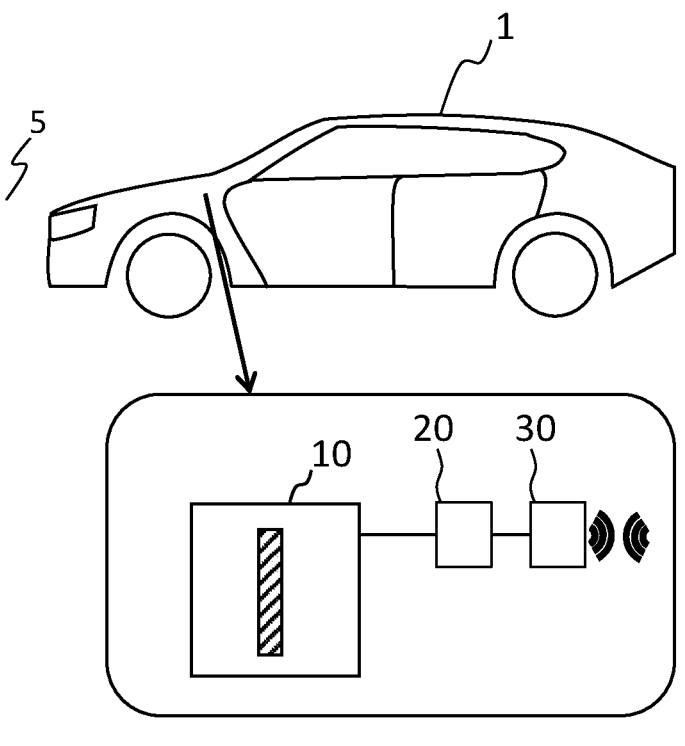
FIGS. 1A and 1B show a vehicle 1 including an air treatment system 10 for treating environment air 5 and a method 100 for treating environment air in accordance with various embodiments.

According to various embodiments, the vehicle may include the air treatment system. As used herein and in accordance with various embodiments, the term environment air may refer to air which is exterior to a vehicle's passenger cabin, example, ambient air also named as air surrounding the vehicle and may pass the vehicle during air treatment by the air treatment system.

The vehicle may be a motor-powered vehicle, for example having 2, 3, 4, or more wheels. Examples of the vehicle are passenger car, truck, buss, lorry, or a rail vehicle, for example a locomotive. The vehicle may include an air inlet opening upstream from the air treatment system (e.g. in a front region), for allowing air ingress and an air outlet, downstream from the air treatment system, for allowing air egress. The air inlet opening behind which the ambient air cleaning device is present may in particular be a cooling air inlet opening and may for example be covered by a radiator grille. For example, this may be at the same level as the front headlights with respect to the vertical axis of the vehicle, or may be located below or above them. The cross-sectional area of the air intake opening may be as large as possible so that the largest possible volume of air can be supplied. In some embodiments, the vehicle may be an electric vehicle or a hybrid (internal combustion engine and electrical) vehicle. In some embodiments, the vehicle may be an internal combustion engine (ICE) vehicle (i.e., non-hybrid). For example, such battery of an ICE vehicle may have a relatively large capacity and may operate the fan for a long time (e.g., 1 h or more) without significant drain even if it is not being charge by an alternator. In some embodiments, the vehicle comprises an internal combustion engine and a cooling fluid temperature (from the hot side) may be used as representation of the engine temperature. In some embodiments, the vehicle comprises a fuel cell and a cooling fluid temperature (from the hot side) may be used as representation of the fuel cell temperature. In some embodiments, the vehicle comprises a battery and a thermal exchange system (comprising a coolant fluid) may be envisaged for control the temperature of the battery.

According to various embodiments, the blower may be a fan. The fan may be an electrical fan. In accordance with various embodiments, the fan may operate within a speed range of fan influence (and not operate out of said range), which may be a speed range in which operation of the fan is able to alter the air flow (e.g., the volumetric air flow in $m^3/s$ or the mass air flow in kg/s). In other words, out of the speed range of fan influence (within the speed range of non-fan influence) the air flow is substantially determined by the speed of the vehicle and is not alterable by the operation of the fan. Thus, not operating the fan out of the speed range of fan influence saves energy. Speed range of fan influence and the speed range of non-fan influence may be determined by measuring the airstream speed for different vehicle speed with the fan turned at this maximum nominal operation speed. Such measurement may be performed when there is no wind (i.e., external wind that would influence the measurements) and at a known temperature, e.g., T=30° C., without any adverse weather event. With these measurements, a threshold of fan influence may be determined which may be specific for the vehicle type and/or air treatment system type. According to various embodiments, the speed range of fan influence may be from 0 km/h until the threshold of fan influence, and speed range of non-fan influence may be from speeds above the threshold of fan influence. The measurements may be performed for a specific car type and a specific fan type. The results of the measurements may be stored in a vehicle's memory (also named herein as computer memory of the vehicle) for later access, for example, the measurements may be stored in processed form as the pre-determined threshold of fan influence, the speed range of fan influence, or the speed range of non-fan influence. The pre-determined threshold of fan influence may be a single value, optionally including a hysteresis. Alternatively, the pre-determined threshold of fan influence may be different values, which depend on the direction of change of the vehicle speed (accelerating or decelerating) and/or may be offset by a hysteresis. The hysteresis may also be stored in the vehicle's memory for later access.

According to various embodiments, the control circuit may be an or part of an ECU, however the disclosure is not limited thereto. Alternatively, the control circuit may be a separate circuit which is operably connectable with the ECU. In another alternative, the control circuit may comprise a separate circuit and an ECU, the separate circuit operably connectable with the ECU. Similarly, the memory may be in one or distributed in more than of abovementioned devices. Operably connectable may include the meaning of connectable via a data communication bus such as CAN bus.

According to various embodiments, the control circuit may obtain weather data, air quality, and/or air temperature by receiving the data from sensors integrated in (e.g., fixed to) the vehicle, for example upstream of an air treatment means, such as a filter. The sensor or sensors may be configured to measure one or both of: air temperature, air quality data, air relative humidity. A rain sensor may also provide rain information.

According to various embodiments, air quality data may include one or more of PM10 concentration, PM2.5 concentration, PM1 concentration, relative humidity, VOC concentration, $NO_x$ concentration. In various embodiments, air quality data may include at least one particulate matter concentration is measured.

Alternatively or in addition to obtaining data from the sensors of the vehicle, said data (or part thereof) may be obtained from a weather database that is external to the vehicle (e.g., via wireless communication), for example from a cloud. Such weather database may be a weather database, e.g., as it is provided by weather service providers. The wireless communication may be provided without limitation, by the cellular infrastructure (3G, 4G, 5G, 6G and above), and/or WIFI. The weather database may provide information such as data representing adverse weather event, and/or air quality data.

Adverse weather event as used herein and in accordance with various embodiments may mean at least one of: snow, rain, sand storm, volcanic ash fall.

According to various embodiments, the air treatment system may be a filtration system comprising a filter as a treatment means. The filter may be a particle filter, for example, to filter out (not let pass thought) PM10 particles and above, PM2.5 particles and above, or PM1 particles and above. The filter may be a fine dust filter.

According to various embodiments, the filter has at least one filter element which may include at least one filter medium which may be folded into at least one filter bellows. The filter may include a plurality of fold stabilizing means which support the filter bellows and are present at a lateral distance of e.g., not more than 150 mm from one another, and for example at least 15 mm from one another, for example 70 mm. It may be provided that the filter medium has an intrinsic bending stiffness of at least 1 $Nm^2$, for example, at least 2 $Nm^2$. This refers to an intrinsic bending stiffness of the filter medium, i.e. in an unprocessed/unfolded state. The filter may comprise pleat stabilizing means. The filtration system may comprise one water separating device.

According to various embodiments, the depth of the filter element in the longitudinal direction of the vehicle may be less than 150 mm, for example less than 110 mm. The depth is preferably not be less than 15 mm, since otherwise the usable filter area would be very low. In one embodiment of the application, the dimensions of an inflow surface of the ambient air purification device may be, for example, 45 cm (height)×65 cm (width) for a typical mid-size passenger car. Depending on the size of the vehicle, however, significant deviations from this are possible, so that a range of dimensions from 20 cm in width to 120 cm in width and 15 cm in height to 100 cm in height are possible in principle.

According to various embodiments, the filter medium of the filter element of the ambient air purification device may be a single-layer or multi-layer filter medium, which may be water-resistant. It may be a multi-layer medium comprising at least one drainage layer and/or one pre-separator layer. Alternatively or additionally, the filter medium may comprise or consist of glass fibres and/or plastic fibres, in particular polyester and/or polyethylene. Finally, it may also be provided that the filter medium has a porosity gradient in a thickness direction, preferably in such a way that a pore size decreases in the direction of airflow.

According to various embodiments, depending on the design of the filter element (volume flow pressure loss characteristic), it can be achieved in conjunction with the fan that the fine dust emissions of the vehicle are completely compensated by the ambient air cleaning device, so that it is a zero-emission vehicle in terms of dust, e.g., in terms of PM10 or PM2.5. For a typical medium-class passenger car, the total particulate matter emission is about 25 mg/km.

According to various embodiments, the filter may include a filter frame, for example, at least partially circumferential frame in which the filter element (e.g., filter bellows) is accommodated. In an example, it may be provided that the frame has an L-shaped cross-sectional form, e.g., wherein one leg of the L-shaped cross-section of the frame engages behind the filter bellows of the filter element, and thus supports it counter to the effect of dynamic pressure. The filter may comprise two or more filter elements, and the filter elements may be arranged in (e.g., fixed to) a single filter frame, or alternatively, each filter element may be arranged in a separate frame element of a filter frame.

According to various embodiments, the filter element may in particular comprise or be a plastic-molded filter element, wherein the at least partially circumferential frame may be connected to the filter medium by a material-to-material bond. However, the invention is not limited to a material connection; as an alternative to the material connection of the filter medium to the frame, it may also be provided that the filter element is merely inserted into the frame, so that it is supported in a form-fitting manner on the rear leg of the L-profile.

According to various embodiments, the filter may be arranged (and arrangeable) into the receptacle. The receptacle may be fixed to the vehicle and may corresponds to the frame of the filter, in which the filter is held, optionally by detachable fastening means, e.g., a clip connection. The receptacle may further be configured to function as a mounting shaft, into which the at least one filter element may be linearly inserted. This makes it easy to replace the filter element, for example from the upper side of a lock carrier of a front hood or from an underbody side which is easily accessible, for example, during servicing on a lifting platform.

In some embodiments, it may further be provided that the filter is arranged with respect to a heat exchanger in such a way that it covers no more than 75% of an incident flow surface of the heat exchanger, so that sufficient residual heat dissipation is possible even when the filter element is loaded. In order to achieve this, the filter element can be arranged offset from the heat exchanger about the vertical and/or transverse direction of the vehicle. The non-covered portion of the heat radiator may form a bypass which may be openable and closeable. In other embodiments, the bypass may be an openable/closeable air passage which is independent from the heat exchanger surface, and the filter and the heat exchanger may be apart from each other at a distance sufficiently large to allow flow of air through the heat exchanger when the bypass is open, and even when the filter is loaded.

As used herein and in accordance with various embodiments, a required capacity may also be referred to as a demand, and vice-versa. A demand may be determined from the vehicle emissions, e.g., the current vehicle emissions which may be measured or calculated based on one or more of: engine, fuel parameters, filter status, catalysator status as known in the art.

As used herein and in accordance with various embodiments, a capacity may be determined based on a filter status and filter parameters. For example, filter status could be determined based on the history of the filter usage and/or calibration data. Alternatively or in addition, a capacity could be determined via sensors, example pressure differential measurements across a filter medium, and based on a calibration curve, the filtration capacity can be determined. Other methods for determining remaining filter capacity are know to the skilled person in the art.

While several embodiments are explained in connection with vehicles, the embodiment detail and explain the air treatment system suitable for use in a vehicle, e.g., to be installed in and/or be part of a vehicle.

Figure 1B:
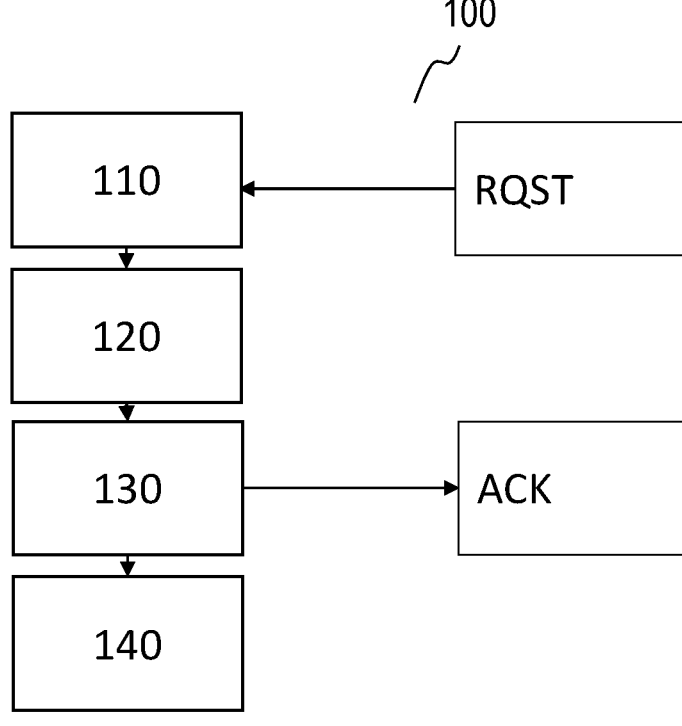

FIGS. 1A and 1B show a vehicle 1 including an air treatment system 10 for treating environment air 5 and a method 100 for treating environment air. The vehicle may further include a control circuit 20 to control the air treatment system 10, the control circuit 20 may be external to or comprised by the air treatment system 10. The vehicle may further include a communication interface 30 configured to wirelessly send and receive commands external to the vehicle 1 and operably coupled to the control circuit 20. The communication interface 30 may be external to or comprised by the air treatment system 10. The control circuit 20 may be configured to, via the communication interface 30, receive 110 a request RQST for treatment. The control circuit 20 may be configured to, determine 120 if the air treatment system has an additional treatment capacity available. The control circuit 20 may be configured to, via the communication interface 30, send 130 an acknowledgement ACK if additional treatment capacity is available. The control circuit 20 may be further configured to control 140 the air treatment system 10 to increase treatment capacity. According to various embodiments, treatment includes filtration and treating includes filtering.

Figure 2:
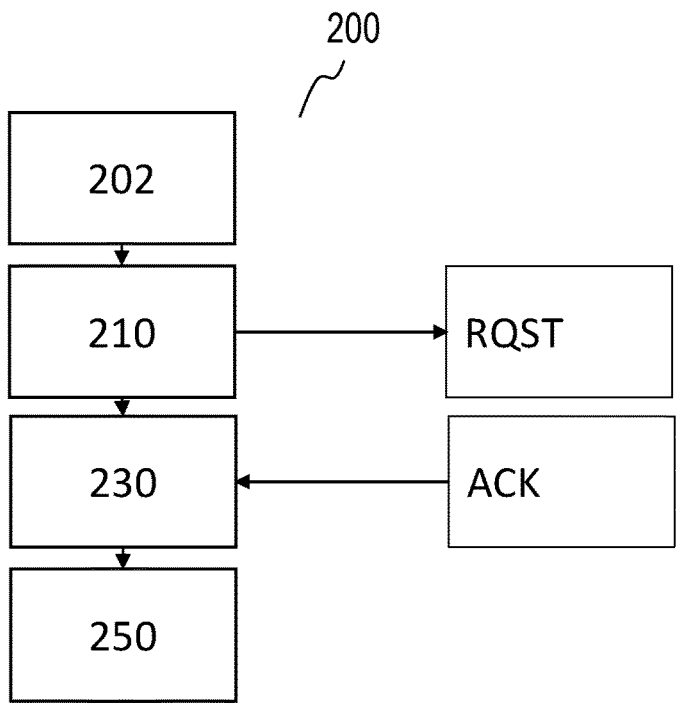
FIG. 2 shows an illustration of a method 200 in accordance with some embodiments.

According to various embodiments, and with reference to FIG. 2 for illustration of a method 200, the control circuit 20 may be configured to determine 202 if there is treatment demand when a local treatment requirement is unsatisfied by the air treatment system. The control circuit 20 may be further configured to if there is a treatment demand, via the communication interface 30, send 210 a request RQST' for remote treatment capacity (or simply referred herein as request for treatment capacity) and receive 230 an acknowledgment ACK'. The control circuit 20 may be further configured to provide (e.g., record) 250 on a memory data indicative of the additional treatment capacity utilized. Said data may be, e.g., a sum of a local treatment capacity and a remote treatment capacity. In an example the memory may be a local memory in the vehicle, such as a memory of or connected to the control unit. In some embodiments, the control circuit 20 may be further configured to receive the data indicative of the additional treatment capacity utilized, e.g., from the supply vehicle. Thus, the method 100 may further include sending data indicative of the additional treatment capacity utilized. Further, the method 200 may further include receiving the data indicative of the additional treatment utilized.

In accordance with various embodiments, a memory may be implemented as any electronic circuit capable of storing information, such as based on D-flip-flips, and/or flash memory. In accordance with various embodiments, a memory may be, without limitation, a local memory, a remote memory, a cache, a general purpose register, a register of a communication interface, or a combination thereof.

According to some embodiments, a control unit may determine that it is able to carry out the air treatment for the demand according to various parameters, for example, based on a filter efficiency, a level of filter loading, and an air quality data (e.g., including a particulate matter measurement for the location of the supply vehicle).

According to various embodiments, a vehicle may be configured as a demand vehicle configured to and capable of carrying out the method (e.g., 200) of requesting remote treatment, or may be configured to and capable of carrying out the method (e.g., 100) of receiving a request for treatment and carrying out the treatment, or may be configured to perform to and capable of carrying out both methods, thus functioning at a time as a demand vehicle and at another time as a supply vehicle, as needed.

According to various embodiments, the acknowledgement ACK, ACK' may include data indicative of the additional treatment capacity CAP1. According to various embodiments, to increase treatment capacity may mean to increase treatment capacity by the additional treatment capacity CAP1.

According to various embodiments, a control circuit may be configured to and capable of determining that there is a demand for air treatment. Such determination may be due to different factors, for example, a net emission category of the vehicle requires that its fine dust ambient air filter is working, however the fine dust ambient air filter may be almost fully loaded, and therefore the filter lifetime can be stretched by utilizing remote air treatment.

According to various embodiments, to receive 110 a request for treatment RQST may include to receive data indicative of a demand DEM1 (i.e., required capacity). Determine 120 if the air treatment system has additional treatment capacity available may include determine whether the additional treatment capacity CAP1 is greater or equal to the demand DEM1.

Figure 3:
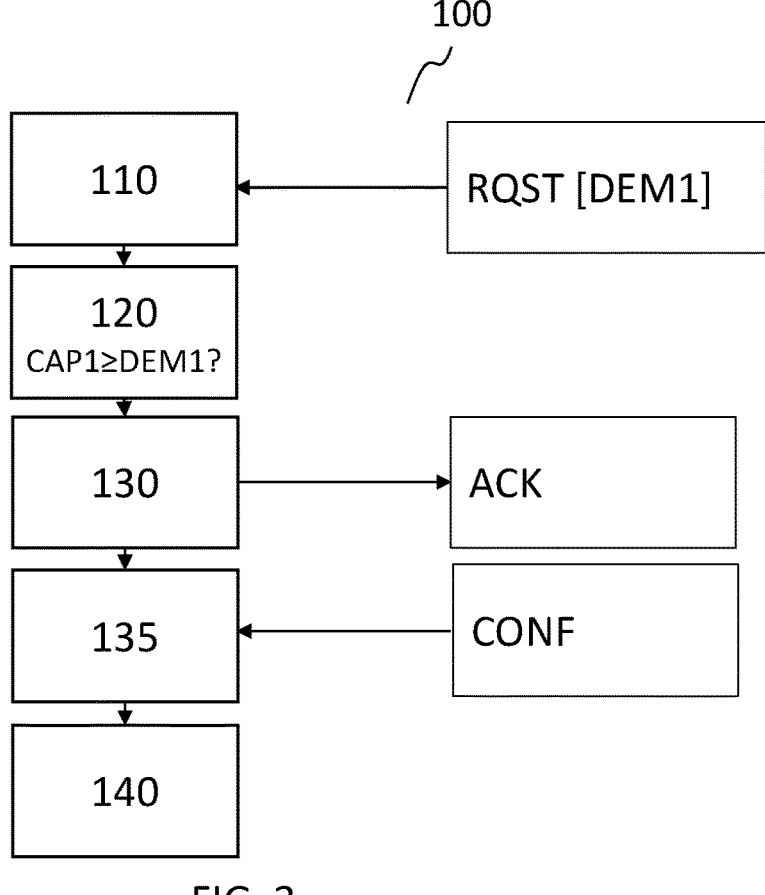
FIG. 3 and FIG. 4 show examples of the method 100 in accordance with some embodiments.

An example is explained in connection with FIG. 3 for illustration purposes. A supply vehicle may receive 110 a RQST for treatment capacity. For example, a demand vehicle of a fleet may determine 202 that there is a demand for air treatment, and send 210 a request RQST for treatment capacity to a supply vehicle. Said request may include a demand DEM1, e.g., mass of particles to be retained by a filter of the supply vehicle. The supply vehicle may determine 120 that it is able to carry out the air treatment for the demand, for example if a capacity CAP1 of the supply vehicle is greater or equal than the demand DEM1. The supply vehicle may, after the determination, send 130 an acknowledgement ACK (e.g., to the demand vehicle) and start performing 140 the air treatment. Alternatively, the supply vehicle may after the determination, send 130 an acknowledgement ACK (e.g., to the demand vehicle) and wait to receive 135 a confirmation CONF, and start performing 140 the air treatment only after receiving 135 the confirmation CONF. It is understood that the example is not limiting any variations thereto are possible, for example the supply vehicle could send its status data to the demand vehicle and the demand vehicle may carry out determination that the supply vehicle has enough capacity for the demand. Alternatively, some of the determinations may be performed exterior to any of the vehicles, e.g., in a cloud to which both vehicles communicate.

According to various embodiments, to receive 110 a request for treatment RQST may include to receive data indicative of a demand DEM1 (i.e., a required capacity). Determine 120 if the air treatment system has additional treatment capacity available may include determine whether the additional treatment capacity CAP1 is greater or equal to the demand DEM1. For example, the capacity could be a capacity per pre-determined time slot, e.g., provided by a "heartbeat" clock used by the control circuit, which could also be known, pre-determined, and/or transmitted to the demand vehicle. Another timing could be used, e.g., a time frame for treatment could be determined during by a communication handshaking.

Figure 4:
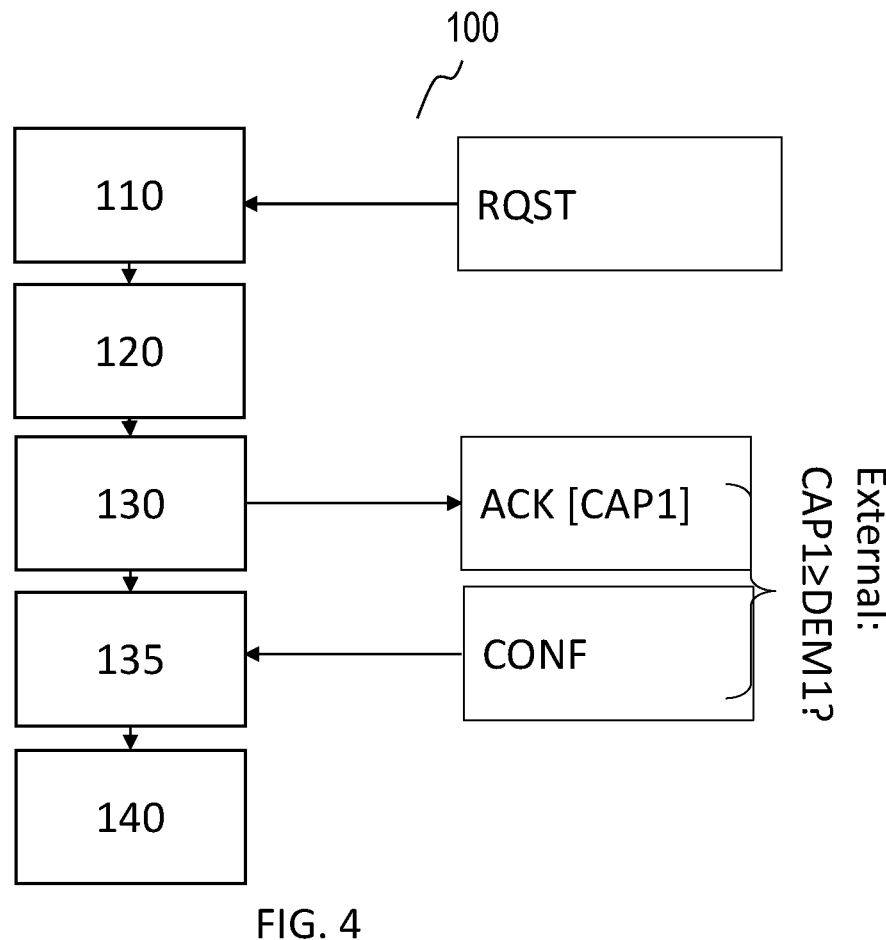

An example is explained in connection with FIG. 4 for illustration purposes. A supply vehicle may receive 110 a RQST for treatment capacity. For example, a demand vehicle of a fleet may determine 202 that there is a demand DEM1 for air treatment, and send 210 a request RQST for treatment capacity to a supply vehicle. The supply vehicle may determine 120 that there is a capacity CAP1 greater than zero, e.g., in the form of a mass of particles to be retained by a filter of the supply vehicle. The supply vehicle may, after the determination, send 130 an acknowledgement ACK (e.g., to the demand vehicle), which may include the capacity CAP1. The supply vehicle may receive a confirmation CONF, for example, the demand vehicle may compare the CAP1 with its demand and determine whether it can use CAP1 (e.g., it may be sufficient to cover the demand or a portion of the demand, $CAP1 \geq DEM1$?) and send the confirmation CONF to the supply vehicle. The supply vehicle may start performing 140 the air treatment after receiving the confirmation CONF. It is understood that the example is not limiting any variations thereto are possible, for example the supply vehicle could send its status data to the demand vehicle and the demand vehicle may carry out determination that the supply vehicle has enough capacity for the demand. Alternatively, some of the determinations may be performed exterior to any of the vehicles, e.g., in a cloud to which both vehicles communicate. In another variation, the supply vehicle may be configured carry out different method variations depending on the type or format of request received, for example, the supply vehicle may be configured to receive a request for air treatment RQST, in the case the request is without demand data the supply vehicle may send the available capacity, and in the case that the request includes demand data, the supply vehicle may perform the determination if capacity>=demand, and only send an acknowledgement ACK if the determination is positive or, optionally send a partial acknowledgement with the capacity<demand. This allows for flexibility, since the demand vehicle may have different reasons for requesting capacity, while a first require may need a limited capacity a second reason may require any available capacity. Thus, overall air treatment may be improved given that the method and the control circuit accept various types of requests.

According to some embodiments, the acknowledgement ACK, ACK' may include data indicative of a cost rate of the additional treatment capacity. According to various embodiments, the control circuit 20 may be further configured to, before to control 140 the air treatment system to increase treatment capacity, receive 135 a request confirmation CONF. The confirmation may include a microtransaction (such as a micropayment) or micropayment indication data.

Figure 5:
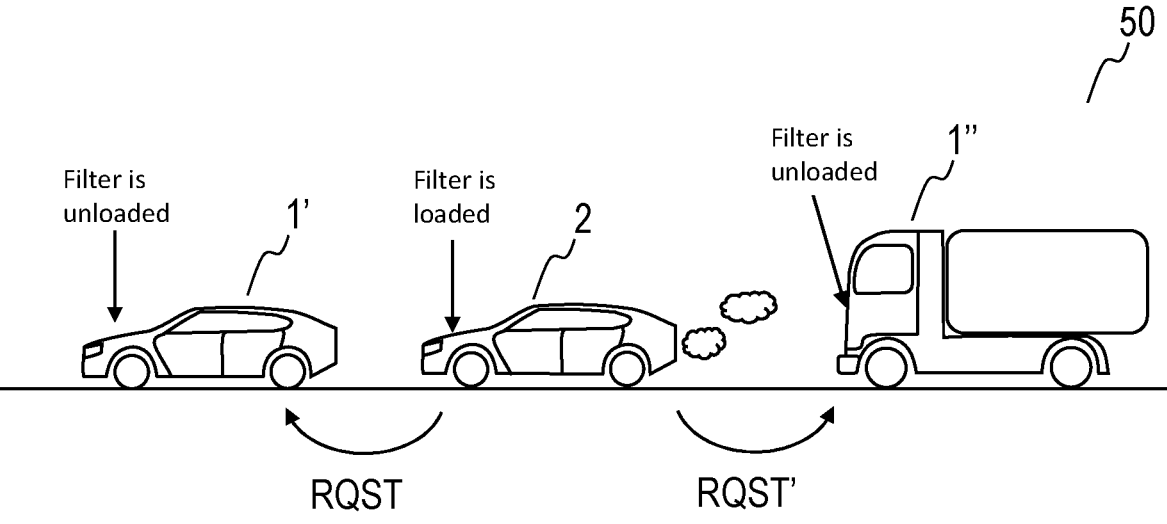
FIG. 5 shows a fleet of vehicles for illustration purposes in accordance with some embodiments.

FIG. 5 shows a fleet of vehicles for illustration purposes. Various embodiments concern a fleet 50 of two or more vehicles 2, 1' in accordance with various embodiments. The two or more vehicles 2, 1' may be configured to operably communicable with each other. The first vehicle 2 (demand vehicle) may be configured to requesting a second vehicle 1' (supply vehicle) to provide air treatment, and the second vehicle 1' may be configured to receive the request and control an air treatment system of the second vehicle 1' to increase treatment capacity in accordance with various embodiments.

According to various embodiments, the fleet 50 may include three or more vehicles 2, 1', 1", wherein a first vehicle 2 is configured to request a plurality of vehicles 1', 1", including at least a second vehicle 1', to provide air treatment, and wherein each vehicle of the plurality of vehicles 1', 1" is configured to receiving the request and control a respective air treatment system to increase treatment capacity in accordance with various embodiments. Thus, vehicles 1' and 1" may compensate a net emission from the first vehicle 2. Other vehicles (e.g., not configured according to the present disclosure) may be part of local traffic but not part of the fleet.

Figures 6, 7:
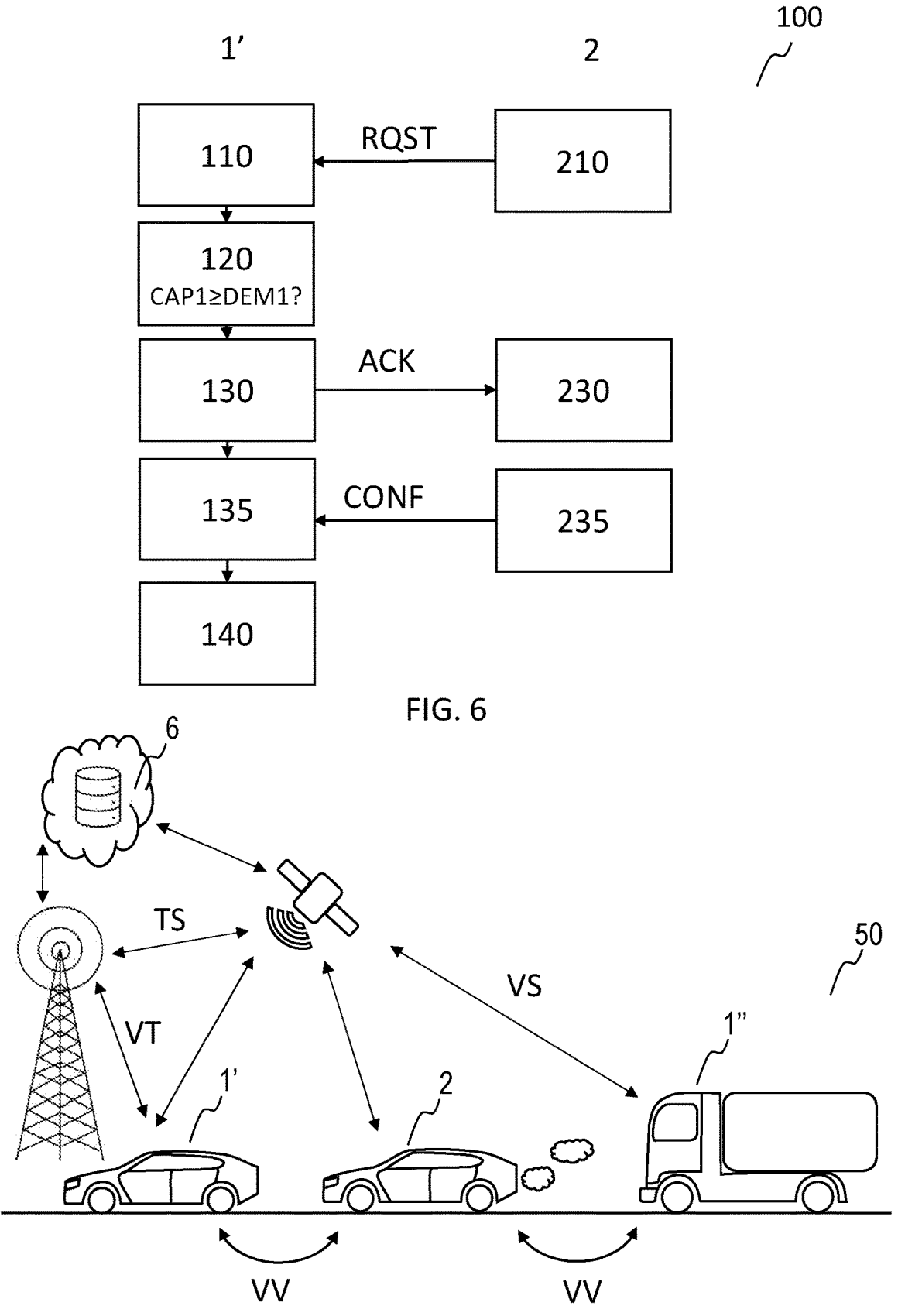
FIG. 6 illustrates how the method of treating environmental air may be run concomitantly for the demand and the supply side in accordance with some embodiments.
FIG. 7 shows a fleet of vehicles in accordance with some embodiments, for illustration purposes.

While FIGS. 1B, 2, 3, and 4 mainly focus on the illustration either of demand or supply vehicle (without being limited thereto), FIG. 6 is used to illustrated how the method of treating environmental air may be run concomitantly for the demand and the supply side.

One aspect of the disclosure concerns a method 100 of treating environmental air. According to various embodiments, the method 100 may further include sending 210, by the demand vehicle 2, a request RQST' for air treatment by a communication interface 30 to a supply vehicle 1'. The method 100 may include receiving 110, by a communication interface 30 of a supply vehicle 1', a request RQST for treatment from a demand vehicle 2. The method 100 may further include determining 120, by a control circuit 20 of the supply vehicle 1', that an air treatment system 10 has an additional treatment capacity available. The method 100 may further include sending 130, by the communication interface 30 of the supply vehicle 1', an acknowledgement ACK from the supply vehicle 1'. The method 100 may further include receiving 230, by the demand vehicle 2, an acknowledgement ACK from the supply vehicle 1'. In some embodiments, the method may include, sending 235, by the demand vehicle 2, a confirmation CONF and receiving 135, by the supply vehicle 1', the confirmation CONF, by such further step, it is possible, e.g., to send with the ACK an available capacity, and the supply vehicle 1' has the option to confirm that it will use the available capacity. The method 100 may further include by the control circuit 20 of the supply vehicle 1', controlling 140 the air treatment system 10 of the supply vehicle 1' to increase treatment capacity. Controlling 140 the air treatment system 10 may include operating the air treatment system.

In some embodiments, the demand vehicle 2 and the supply vehicle 1' may communicate one or more movement data, e.g., routing or velocity vectors, which may serve for determining a distance or an overlap of the second vehicle within a desired region of the first vehicle, such as a radius of a circle centered on the first vehicle, or a region in which the first vehicle has passed or will pass within a predetermine time. For example movement data of the demand vehicle 2 may be transmitted to the supply vehicle 1' for determination of distance at the supply vehicle 1', movement data of the supply vehicle 1' may be transmitted to the demand vehicle 2 for determination of distance at the demand vehicle 2, and/or movement data of the supply vehicle 1' and the demand vehicle 2 may be sent to a processor exterior to both vehicles (e.g., a cloud our another vehicle) for determination of distance.

According to various embodiments, the method 100 may further include, by the demand vehicle 2, determining that there is an air treatment demand by determining that there is a local treatment requirement unsatisfied by the air treatment system, before sending 210 the request for air treatment. In this context, the term "local" means from the demand vehicle 2.

According to various embodiments, the method 100 may further include recording 250, on a local memory of the supply vehicle 1' (and/or on the demand vehicle 2), data indicative of the additional treatment capacity utilized. According to various embodiments, the acknowledgement ACK may include data indicative of an additional treatment capacity CAP1. According to various embodiments, controlling 140 the air treatment system 10 to increase treatment capacity may include the meaning to increase the treatment capacity by the additional treatment capacity CAP1. According to various embodiments, receiving 110 a request for treatment may include receiving data indicative of a demand DEM1 (in other words, a required capacity). Determining 120 that the air treatment system has additional treatment capacity available may include determining that the additional treatment capacity CAP1 is greater or equal to the demand DEM1.

According to various embodiments, the method 100 may further include before controlling 140 the air treatment system to increase treatment capacity, receiving CONF a request confirmation, optionally including a microtransaction (such as a micropayment) or micropayment indication data. The acknowledgement ACK may include data indicative of a cost rate of the additional treatment capacity.

FIG. 7 shows a fleet of vehicles in accordance with various embodiments, for illustration purposes. Various embodiments concern a fleet 50 of two or more vehicles 2, 1', 1" in accordance with various embodiments. The two or more vehicles 2, 1', 1" may be configured to operably communicable with each other. In some embodiments the two or more vehicles 2, 1', 1" may communicate with each other via vehicle-to-vehicle communication VV; for example directly (free of any transponder or transceiver, external to the vehicles). Alternatively or in addition, the two or more vehicles 2, 1', 1" may communicate with each other via infrastructure external to the vehicle, such as a satellite (vehicle to satellite communication VS), mobile phone network VT, a transponder, a transceiver, or a combination thereof, for example, the communication may further be via a server, e.g. in a cloud.

According to various embodiments, communication between two vehicles, either directly (vehicle-to-vehicle) or indirectly (e.g., via infrastructure) may be provided by one or more of may operate according to any one or more of the following radio communication technologies and/or standards including but not limited to: Global System for Mobile Communications (GSM) radio communication technology, General Packet Radio Service (GPRS) radio communication technology, Enhanced Data Rates for GSM Evolution (EDGE) radio communication technology, Third Generation Partnership Project (3GPP) radio communication technology, Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP any of Releases 9 to 17 and subsequent releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Public Land Mobile Telephony), MTD (Swedish abbreviation for Mobile telephony system D), Public Automated Land Mobile (Autotel/PALM), ARP (Finnish for car radio phone), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as 3GPP Generic Access Network, or GAN standard, Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a) WiFi-direct, ANT/ANT+, ZigBee, Z-Wave, 3GPP device-to-device (D2D) or Proximity Services (ProSe), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, mmWave standards in general (wireless systems operating at 10-300 GHz and above such as WiGig, IEEE 802.11ad, IEEE 802.11 ay), technologies operating above 300 GHz and THz bands, (3GPP/LTE based or IEEE 802.11p and other) V2X communication technologies, 3GPP cellular V2X, DSRC (Dedicated Short Range Communications) communication systems such as Intelligent-Transport-Systems and others, the European ITS-G5 system (i.e. the European implementation of IEEE 802.11p based DSRC, including ITS-G5A, ITS-G5B, ITS-G5C). In addition to the radio communication technologies and/or standards listed above, any number of satellite uplink technologies may be used including, for example, radios compliant with standards issued by the ITU (International Telecommunication Union), or the ETSI (European Telecommunications Standards Institute), Starlink™ among others. The embodiments provided herein are thus understood as being applicable to various other communication technologies, both existing and not yet formulated.

According to various embodiments, the method may include determining whether the supply vehicles are within a pre-determined radius of the demand vehicle and only carry out air treatment of the supply vehicles that are within the pre-determined radius.

Figure 8:
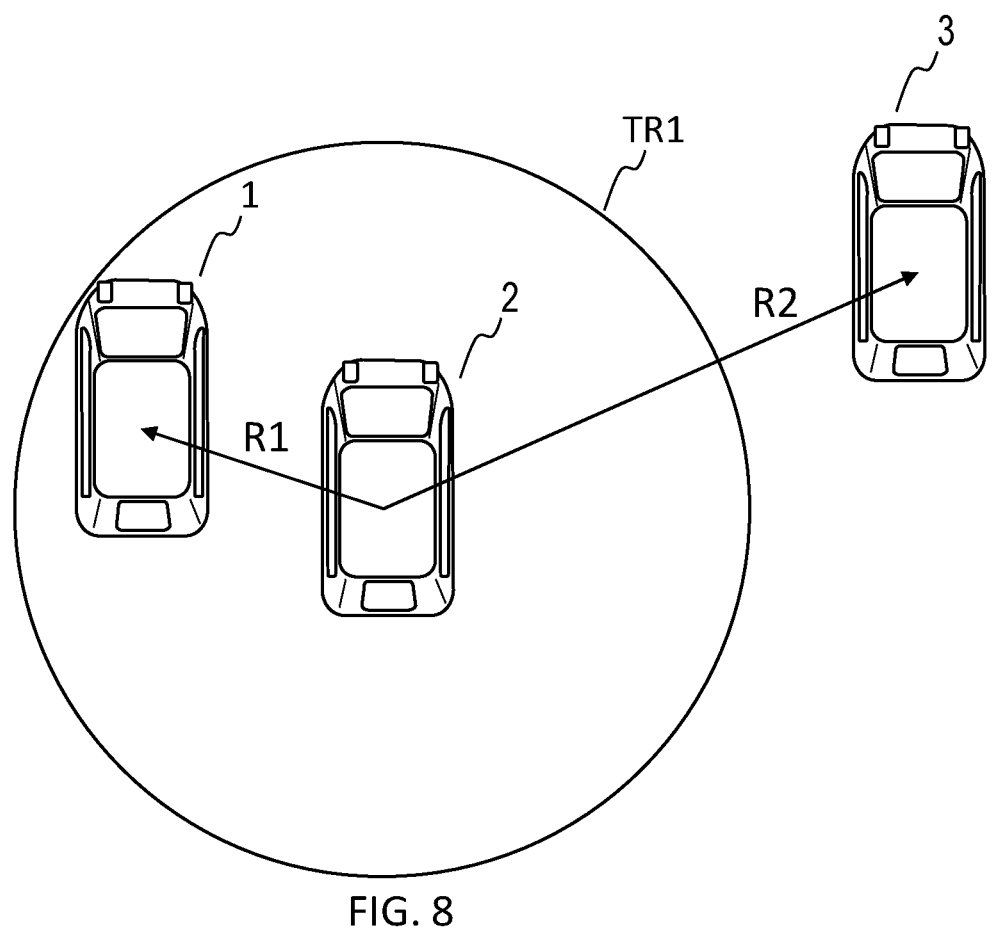
FIG. 8 shows a schematic illustration of a fleet from a top view including vehicles 1, 2, and 3 in accordance some various embodiments.

FIG. 8 shows a schematic illustration of a fleet including vehicles 1, 2, and 3 in accordance with various embodiments. Vehicle 2 may be a demand vehicle and may be configured to send a request for air treatment to supply vehicles 1 and 3. The method may include determining whether supply vehicles 1 and 3 are within a predetermined radius TR1 for air treatment, wherein the pre-determined radius TR1 is centered on the demand vehicle 2. The center of the pre-determined radius TR1 may be on a pre-determined position of the vehicle, for example, at the location of the antenna of or connected to the communication interface and used for the communication. A distance of a demand vehicle to the center of the circle with pre-determined radius TR1 may be determined from the center to a pre-determined position of the vehicle, e.g., at the location of the antenna of or connected to the communication interface and used for the communication, of the supply vehicle. For the illustrated pre-determined radius TR1 it can be seen that vehicle 1 is at a radius R1 which is within the pre-determined radius TR1. In comparison vehicle 3 is at a radius R2 which is greater than TR1. Therefore, even if communication may be established between supply vehicle 2 and demand vehicle 1, and supply vehicle 2 and demand vehicle 3, the determination would result in that the vehicle 2 is determined to be within the pre-determined radius TR1 and that the vehicle 3 is not within the pre-determined radius TR1. Thus, supply vehicle 1 may provide air treatment, while supply vehicle 3 may not provide air treatment, e.g., by not receiving a request RQST, by not receiving a confirmation CONF, by not sending an acknowledgement ACK, or a combination thereof.

According to various embodiments, the method may include determining whether a supply vehicle's route passes through (e.g., overlaps) with a route of the demand vehicle even if at different times, e.g., different times of a day. Alternatively or in addition, the method may include determining whether a supply vehicle's passes at or close (within the pre-determined radius) a previous position of a demand vehicle, for example, by matching positions of supply vehicle and demand vehicle.

Figure 9:
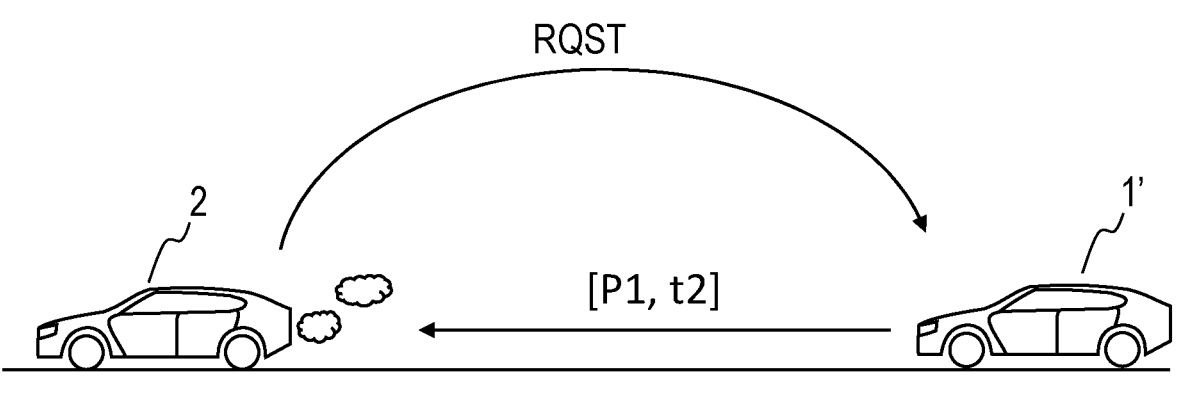
FIG. 9 shows a schematic illustration of a fleet including vehicles 1' and 2 in accordance with various embodiments.

FIG. 9 shows a schematic illustration of a fleet including vehicles 1' and 2 in accordance with various embodiments. At a time t1 the demand vehicle may be at a position P1. The method may include determining which other vehicles of the fleet have a route that pass through or close by (e.g., within the pre-determined radius) of position P1 at a future time t2, which may include determining that at least one supply vehicle 1' passes at or close to the position P1 at a time t2. In one example, the determining includes sending a request RQST and may further include receiving route data or position confirmation for a future time, e.g., in the form of "[P1, t2]". The method may further include sending the request for air treatment from the demand vehicle 2 to the supply vehicle 1' at a time before t2 (E.g., at a time t1) and carrying out the air treatment by the supply vehicle 1' at a time t2. Thereby, air at position P1 may be treated and the air quality improved even if no supply vehicles are within the pre-determined radius at the time t1 in which the demand vehicle 2 passes at the position P1. The determining which other vehicles of the fleet have a route that pass through or close by of position P1 at a future time t2 may include determining limiting time t2 to within a pre-determined time frame or time slot, e.g., to a same day, or to a same period of time, for example within a period of time selected from 1 h to 24 h (endpoints included), for example within 24 h.

Figure 10:
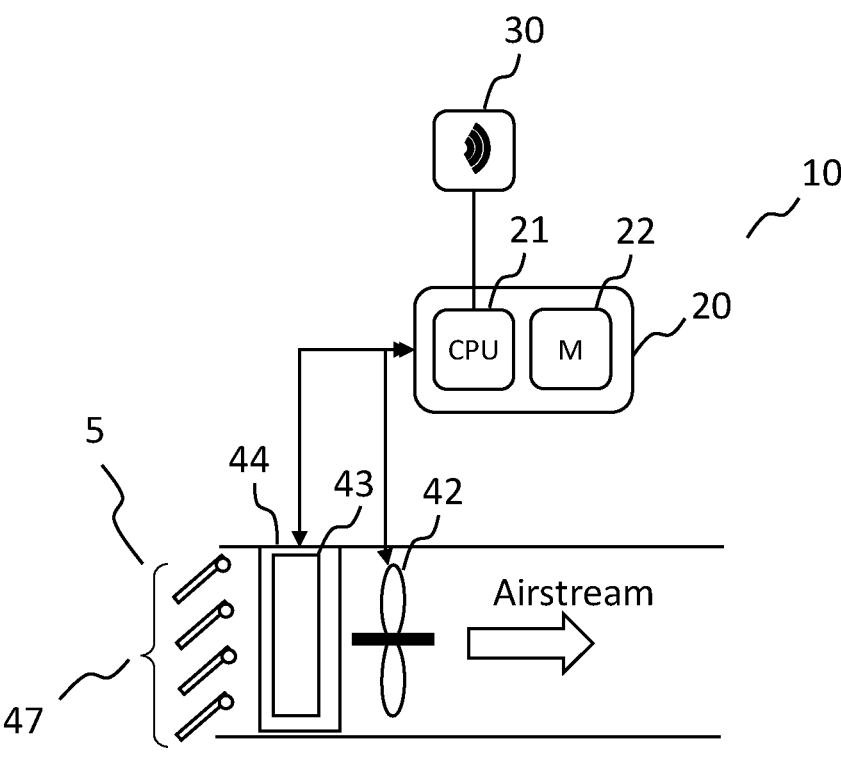
FIG. 10 shows a schematic of an air treatment system 10 for cleaning environmental air in accordance with various embodiments.

FIG. 10 shows a schematic of another embodiment of an air treatment system 10 for cleaning environmental air. The schematic is simplified for easier explanation of the disclosure. The air treatment system 10 may include a receptacle 44 configured to receive a filter 43. As can be seen, when filter 43 is installed in the receptacle 44 it is in stream a blower 42 (e.g., a fan) of a vehicle 1 in an airstream when air is flowing through the filter 43. The air treatment system 10 may include a computer memory 22 storing instructions to cause the microprocessor 21 to carry out the method in accordance with various embodiments. Further to the shutter 47, the air treatment system 10 of FIG. 10 may include an additional shutter and/or a bypass. The air treatment system 10 may further include the filter 43. A blower may also be dispensed with, and the airflow through the filter may be generated when the vehicle 1 is in movement.

Various embodiments of the disclosure enable a vehicle to receive emissions, such as particle emission, compensation from other vehicles. Compensation may also be at a same location, another location, or another time for the same location. Compensation performed at the vicinity of the vehicle can avoid pollution peaks effectively creating a cleaner vehicle, when the neighboring cars, or cars passing right before or shortly after at the same location, of a fleet may provide the necessary air treatment.

The invention claimed is:

1. An air treatment system for treating environment air comprising:
   a control circuit; and
   a communication interface operably coupled to the control circuit and configured to wirelessly send and receive commands;
   wherein the control circuit is configured to:
      via the communication interface, receive a request for treatment;
      determine if the air treatment system has an additional treatment capacity available;
      via the communication interface, send an acknowledgement if the additional treatment capacity is available; and
      control the air treatment system to increase a treatment capacity;
   and wherein the control circuit is further configured to:
      determine if there is a treatment demand when a local treatment requirement is unsatisfied, and
      if there is the treatment demand, via the communication interface, send a request for a remote treatment capacity.

2. The air treatment system of claim 1, wherein the acknowledgement comprises data indicative of the additional treatment capacity.

3. The air treatment system of claim 1, wherein to increase the treatment capacity is to increase the treatment capacity by the additional treatment capacity.

4. The air treatment system of claim 1, wherein the receiving of the request for treatment comprises receiving a demand, and wherein, the determining if the air treatment system has additional treatment capacity available comprises determining whether the additional treatment capacity is greater than or equal to the demand.

5. The air treatment system of claim 1, wherein the acknowledgement comprises data indicative of a cost rate of the additional treatment capacity, and wherein the control circuit is further configured to receive a request confirmation before controlling the air treatment system to increase the treatment capacity.

6. The air treatment system of claim 1, wherein the control circuit is further configured to record on a memory data indicative of the increase in the treatment capacity.

7. The air treatment system of claim 1 provided in at least one vehicle.

8. A fleet of two or more vehicles, each vehicle comprising an air treatment system for treating environment air, the two or more vehicles of the fleet operably communicable with each other, wherein a first vehicle of the fleet is configured to request a second vehicle of the fleet to provide an air treatment, and wherein the second vehicle of the fleet is configured to receive the request and control the air treatment system of the second vehicle of the fleet to increase a treatment capacity;
   wherein at least the air treatment system of the second vehicle comprises:
   a control circuit; and
   a communication interface operably coupled to the control circuit and configured to wirelessly send and receive commands,
   wherein the control circuit is configured to:
      via the communication interface, receive the request;
      determine if the air treatment system of the second vehicle has an additional treatment capacity available;
      via the communication interface, send an acknowledgement to the first vehicle if the additional treatment capacity is available; and
      control the air treatment system of the second vehicle to increase the treatment capacity.

9. The fleet of claim 8 comprising three or more vehicles, wherein the first vehicle of the fleet is configured to request a plurality of the other of the three or more vehicles of the fleet, comprising at least the second vehicle of the fleet, to provide the air treatment, and wherein each vehicle of the plurality of the other of the three or more vehicles of the fleet is capable of receiving the request and controlling a respective air treatment system to increase the treatment capacity.

10. An air treatment system for treating environment air comprising:
   a control circuit; and
   a communication interface operably coupled to the control circuit and configured to wirelessly send and receive commands;
   wherein the control circuit is configured to:
      via the communication interface, receive a request for treatment;
      determine if the air treatment system has an additional treatment capacity available;
      via the communication interface, send an acknowledgement if the additional treatment capacity is available; and control the air treatment system to increase a treatment capacity;

wherein the receiving of the request for treatment comprises receiving a demand; and wherein, the determining if the air treatment system has additional treatment capacity available comprises determining whether the additional treatment capacity is greater than or equal to the demand.

11. An air treatment system for treating environment air comprising:

a control circuit; and a communication interface operably coupled to the control circuit and configured to wirelessly send and receive commands;

wherein the control circuit is configured to:

via the communication interface, receive a request for treatment;

determine if the air treatment system has an additional treatment capacity available;

via the communication interface, send an acknowledgement if the additional treatment capacity is available; and control the air treatment system to increase a treatment capacity;

wherein the acknowledgement comprises data indicative of a cost rate of the additional treatment capacity; and wherein the control circuit is further configured to receive a request confirmation before controlling the air treatment system to increase the treatment capacity.

12. An air treatment system for treating environment air comprising:

a control circuit; and a communication interface operably coupled to the control circuit and configured to wirelessly send and receive commands;

wherein the control circuit is configured to:

via the communication interface, receive a request for treatment;

determine if the air treatment system has an additional treatment capacity available;

via the communication interface, send an acknowledgement if the additional treatment capacity is available; and control the air treatment system to increase a treatment capacity;

and wherein the control circuit is further configured to record on a memory data indicative of the increase in the treatment capacity.

* * * * *